United States Patent
Chen

(10) Patent No.: US 7,715,809 B2
(45) Date of Patent: May 11, 2010

(54) EDGE MODULATOR

(75) Inventor: Yue Chen, Sunnyvale, CA (US)

(73) Assignee: Broadcom Corporation

( * ) Notice: Subject to any disclaimer, the term of this patent is extended or adjusted under 35 U.S.C. 154(b) by 1962 days.

(21) Appl. No.: 10/272,507

(22) Filed: Oct. 15, 2002

(65) Prior Publication Data
US 2003/0109227 A1  Jun. 12, 2003

Related U.S. Application Data

(60) Provisional application No. 60/329,589, filed on Oct. 15, 2001.

(51) Int. Cl.
  H04B 1/40     (2006.01)
  H04B 1/00     (2006.01)
  H03C 3/00     (2006.01)
  H04L 5/12     (2006.01)
  H04L 27/36    (2006.01)

(52) U.S. Cl. .......................... 455/110; 455/75; 455/112; 455/113; 375/302; 375/261; 375/298

(58) Field of Classification Search .................. 375/81, 375/95, 207–307, 340, 359, 362, 135, 308; 455/11.1, 12.1, 91, 126, 127.1, 73, 403, 323, 455/118, 112; 332/103, 144, 100
See application file for complete search history.

(56) References Cited

U.S. PATENT DOCUMENTS 4,296,380 A * 10/1981 Minakuchi .................. 377/110
4,468,788 A * 8/1984 Stoneburner ................ 375/239
5,055,802 A * 10/1991 Hietala et al. ................. 331/16
5,282,227 A * 1/1994 Crawford .................... 375/327
5,425,055 A * 6/1995 Blaker ........................ 375/279
5,778,027 A * 7/1998 Ostman et al. .............. 375/298
5,793,825 A * 8/1998 Humphreys et al. ......... 375/375
5,942,955 A * 8/1999 Matui ......................... 332/101
5,960,040 A * 9/1999 Cai et al. .................... 375/279
5,991,605 A * 11/1999 Rapeli ......................... 455/76
6,173,164 B1 * 1/2001 Shah ........................ 455/182.1
6,546,044 B1 * 4/2003 Dent .......................... 375/216
6,687,303 B1 * 2/2004 Ishihara ................. 375/240.21
6,861,900 B2 * 3/2005 Smidth ....................... 329/304
2003/0081693 A1 * 5/2003 Raghavan et al. ........... 375/298

* cited by examiner

Primary Examiner—George Eng
Assistant Examiner—Nam Huynh
(74) Attorney, Agent, or Firm—McAndrews, Held & Malloy Ltd.

(57) ABSTRACT

Circuits and methods for modulators that receive symbols, and provide I (incident, or in-phase) and Q (quadrature) component values from a look-up table for subsequent filtering and digital-to-analog conversion. The I and Q component values depend on frequency correction and time index signals such that operating frequency differences between a handset and base station are compensated for, and the transmitted symbols are continuously phase shifted by $3\pi/8$ radians.

20 Claims, 7 Drawing Sheets

| Modulating bits $d_{3i}, d_{3i+1}, d_{3i+2}$ | Symbol parameter $l$ |
|---|---|
| (1,1,1) | 0 |
| (0,1,1) | 1 |
| (0,1,0) | 2 |
| (0,0,0) | 3 |
| (0,0,1) | 4 |
| (1,0,1) | 5 |
| (1,0,0) | 6 |
| (1,1,0) | 7 |

In the lookup table, only quarter of in-phase components of all possible 8PSK constellation points are stored. Its content is showed as follows:

Table_8PSK={ 1,  2,  3,  4,  5,  6,  7,  8,  9, 10, 11, 12, 13, 14, 15, 16, 17, 18, 19, 20,
             ↑22, 23, 24, 25, 26, 27, 28, 29, 30, 31, 32, 33, 34, 35, 36, 37, 38, 39, 40←540,
             510
             41, 42, 43, 44, 45, 46, 47, 48, 49, 50, 51, 52, 53, 54, 55, 56, 57, 58,
             59, 60, 61, 62, 63, 64, 65, 66, 67, 68, 69, 70, 71, 72, 73, 74←560,
             ↑74, 75, 76, 77, 78, 79, 80, 80, 81, 82, 83, 84, 84, 85, 86, 86,
             550
             87, 88, 89, 89, 90, 90, 90, 91, 92, 92, 93, 93, 94, 95, 95, 95, 96, 96,
             ↑97, 97, 97, 98, 98, 99, 99, 99,100,100,100,101,101,101,101,101,102,102,
             530
             102,102,102,103,103,103,103,103,103,104,104,104,104,104,104,104,104,104}.
                                                                                 ↑
                                                                                520

*Note: Phase resolution is about 0.7 degree.*

FIGURE 5

EDGE MODULATOR

CROSS-REFERENCES TO RELATED APPLICATIONS

This application claims the benefit of U.S. provisional application No. 60/329,589, filed Oct. 15, 2001, which is incorporated by reference.

BACKGROUND

This application relates to modulators for wireless transmitters, and more particularly to modulators for wireless transmitters consistent with the EDGE standard.

Wireless handsets or terminals communicate with each other through the air using base stations or cell antennas as intermediaries. Each handset or terminal includes a transmitter and a receiver. Transmitters receive binary data and convert this data to symbols, forming a signal that is transmitted. Receivers receive the transmitted symbols, and convert them to binary data. The base stations are capable of receiving and transmitting several signals simultaneously.

The frequency at which a handset transmits symbols is determined by a clock signal that is generated locally, that is, in the handset. This clock signal is typically generated using a crystal or other periodic clock source. These crystals are highly accurate, for example, they may be accurate to within a few parts per million. But a base station has its own locally generated clock source, which is, typically, extremely accurate, and does not necessarily match the frequency of the clock signal in a particular handset. Also, to reduce costs of the handsets, it is desirable to use rower costs crystals having higher tolerances, leading to larger frequency differences between a handset and a base station.

Accordingly, a frequency correction may be used to correct for differences in frequency between the handset crystal and the base station clock. A base station typically communicates with several handsets. Thus it is desirable for the frequency correction to occur at the handset—it would be very difficult for the base station to adjust to several handsets simultaneously. Instead, a frequency offset may be determined by comparing the frequency of symbols received from a base station to the handset clock signal. This frequency offset may then be used to correct the frequency of symbols transmitted from the handset to the base station.

Also, the EDGE standard provides for a $3\pi/8$ phase shift to each transmitted symbol. This phase shift reduces zero crossings seen at the transmitter power amplifier, and the fluctuations in the output envelope are reduced.

Thus, it is desirable to have a modulator that provides frequency correction, a $3\pi/8$ phase shift, and converts symbols to I and Q component values for transmission.

SUMMARY

Accordingly, an exemplary embodiment of the present invention provides a modulator that receives symbols and provides I (incident, or in-phase) and Q (quadrature) component values from a look-up table for subsequent filtering and digital-to-analog conversion. These I and Q values are dependent on phase error and time index signals such that frequency differences between a handset and a base station are compensated for, and a $3\pi/8$ phase shift is applied to each symbol.

Another exemplary embodiment of the present invention provides a method of transmitting a wireless signal. The method includes generating a time index signal, receiving a frequency offset signal, accumulating the frequency offset signal, dividing the accumulated frequency offset signal, receiving an input symbol, and determining an incident value and a quadrature value. These values are determined using the time index signal, the divided accumulated frequency offset signal, and the received input symbol.

A further exemplary embodiment of the present invention provides an integrated circuit including a transceiver. The transceiver includes a receiver and a transmitter coupled to the receiver. The transmitter includes a modulator. The modulator in turn includes a counter, a summer coupled to an output of the counter, a divider coupled to an output of the summer, and a look-up table coupled to an output of the divider and an output of the counter. The lookup table receives input symbols and provides in-phase and quadrature values.

Yet another exemplary embodiment of the present invention provides a modulator. The modulator includes a counter configured to provide a time index signal, a summer configured to receive a frequency offset signal and the time index signal and provide a cumulative phase error, a divider configured to receive the cumulative phase error and provide a phase offset index, and a look-up table configured to receive the phase offset index and the time index. The look-up table is further configured to receive an input symbol and provide in-phase and quadrature component values.

A better understanding of the nature and advantages of the present invention may be gained with reference to the following detailed description and the accompanying drawings.

BRIEF DESCRIPTION OF THE DRAWINGS

FIG. 3 is a chart showing the translation of modulating bits to symbols used in a specific embodiment of the present invention;

FIG. 5 illustrates the entries stored in a lookup table used by a specific embodiment of the present invention;

DESCRIPTION OF SPECIFIC EMBODIMENTS

Figure 1:
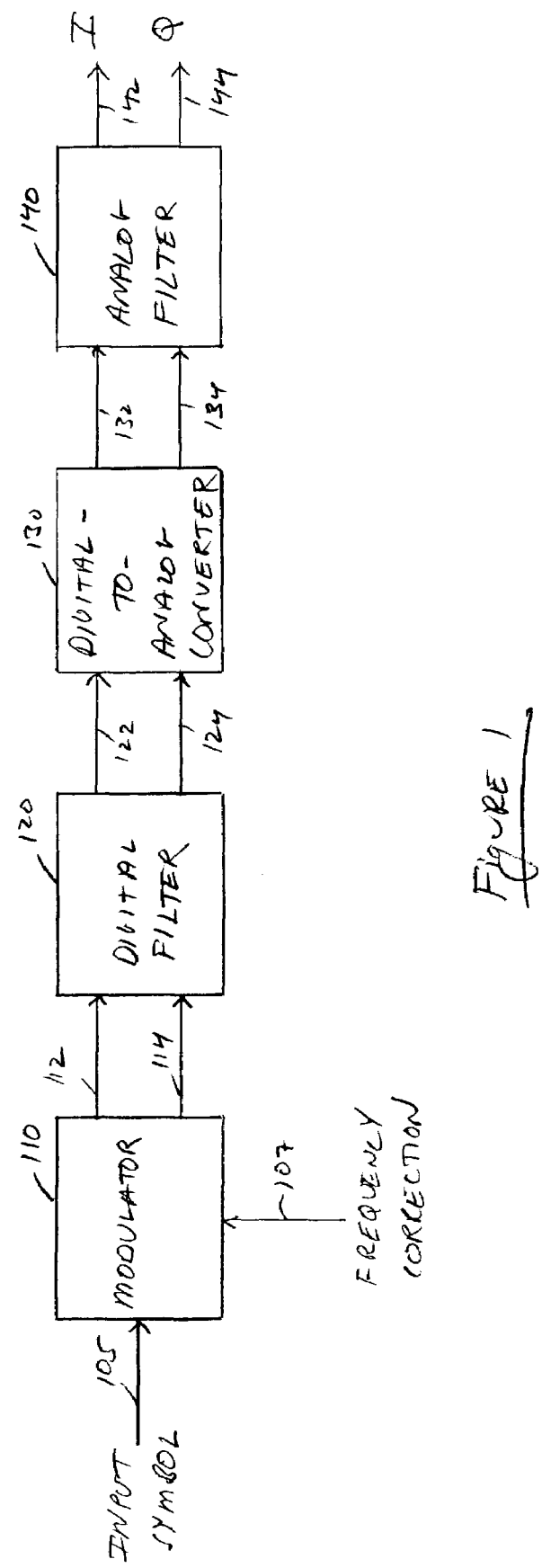
FIG. 1 is a block diagram of a portion of a wireless transmitter consistent with an embodiment of the present invention.

FIG. 1 is a block diagram of a portion of a wireless transmitter consistent with an embodiment of the present invention. Included are modulator 110, digital filter 120, digital-to-analog converter 130, and analog filter 140. The modulator 110 receives input symbols on line 105 and a frequency correction signal on line 107. Analog filter 140 provides I and Q outputs on lines 142 and 144, which are typically, perhaps after further processing, multiplied by one or more transmitter carrier signals, summed, and provided to an antenna for transmission. This figure, as with all the included figures, is included for exemplary purposes only, and does not to limit either the possible embodiments of the present invention, or the claims.

A wireless transmitter incorporating the block diagram of FIG. 1 is typically found on a handset, or terminal, that is compliant with the GSM (global system for mobile communications) or EDGE (enhanced data for GSM evolution) standards. Often, several of these handsets are in communication with a single base station. Each handset generates its own carrier signal, typically using a crystal or other periodic clock source. These crystals are highly accurate, but the frequency they generate does vary over a range. That is, each crystal has a tolerance associated with its frequency of operation.

But again, each handset communicates with a base station, and the base station has its own frequency of operation. Accordingly, each handset receives a signal from the base station, generates a frequency correction, and uses that to correct the transmitter symbol frequency. In this way, the base station receives signals from a number of handsets, each handset transmitting symbols at approximately the frequency expected by the base station. An example of a receiver including methods and circuits for determining a frequency correction can be found in copending U.S. patent application Ser. No. 10/228,165, filed Aug. 26, 2002, titled Frequency Offset Correction Circuit for WCDMA, by Chang, which is hereby incorporated by reference.

This frequency correction is received by the modulator 110 on line 107. This adjusts the value of the I and Q outputs of the modulator 110, such that the transmitted symbol rate is approximately equal to the received symbol rate from the base station.

Figure 2:
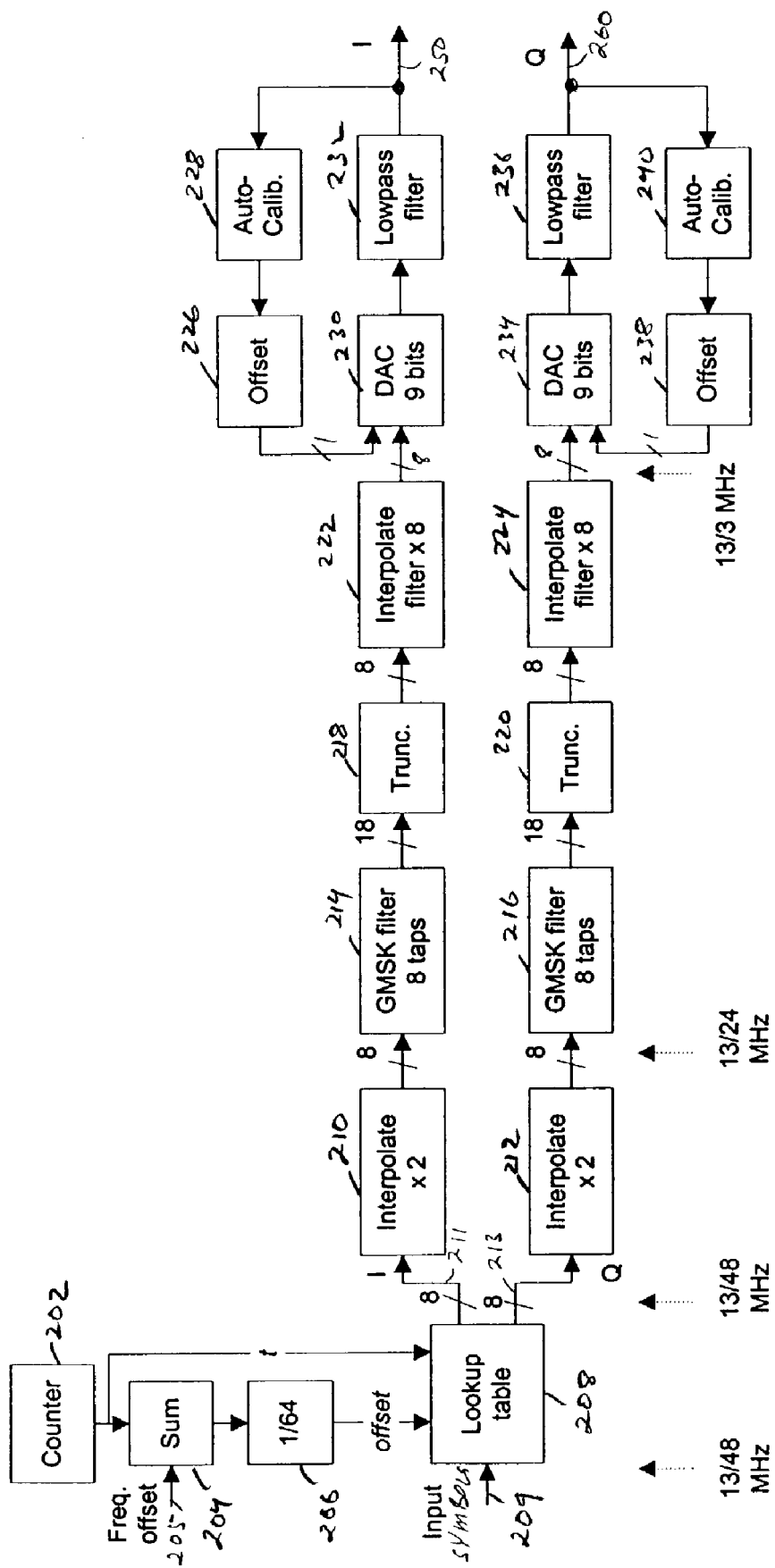
FIG. 2 is a more detailed block diagram of the transmitter portion of FIG. 1.

FIG. 2 is a more detailed block diagram of the transmitter portion of FIG. 1. Included are a modulator including counter 202, summer 204, divider 206, and lookup table 208, a digital filter including a interpolators 210 and 212, 8-tap filters 214 and 216, truncators 218 and 220, and interpolators 222 and 224, digital-to-analog converters (DACs) 230 and 234, and analog filters 232 and 236. Also included are auto-calibration circuits 228 and 240, and offset circuits 226 and 238.

The modulator receives a frequency offset on line 205, and input symbols on line 209, and provides I and Q values to the digital filters on lines 211 and 213. In one embodiment of the present invention, the I and Q values are each 8-bits wide, including 7 bits and a sign-bit. In other embodiments, these values may differ. The modulating symbol rate is 1/T=1 625/6 ksymb/s (i.e. approximately 270.833 ksymb/s), which corresponds to 3*1 625/6 kbit/s or 812.5 kbit/s.

The I and Q values are received by interpolators 210 and 212. These interpolators insert a zero after each I and Q value provided by the lookup table 208. Accordingly, to maintain the data rate consistent with the symbol rate on line 209, the output of the interpolators operate at twice the frequency as their input, as indicated. In other embodiments, the I and Q values may simply be repeated—the scheme used may be optimized to simplify the filter that follows.

The outputs of the interpolators 210 and 212 are received by the filters 214 and 216. In a specific embodiment, these filters are 8-tap filters. Alternately, in other embodiments, a different number of taps may be used. More taps generally lead to a more accurate response, at the expense of greater circuit complexity. These filters included a series of delays, the outputs of which are multiplied by coefficients, and summed. The truncated linearized GMSK filter coefficients used by a specific embodiment of the present invention are {5 89 394 716 716 394 89 5}.

The modulating 8PSK symbols $\hat{s}_i$ as represented by Dirac pulses excite these linear pulse shaping filters. The filters are linearized GMSK pulse, in other words, the main component in a Laurant decomposition of the GMSK modulation. The impulse response is defined by:

$$c_0(t) = \begin{cases} \prod_{i=0}^{3} S(t+iT), & \text{for } 0 \leq t \leq 5T \\ 0, & \text{else} \end{cases}$$

where $$S(t) = \begin{cases} \sin\left(\pi \int_0^t g(t')dt'\right), & \text{for } 0 \leq t \leq 4T \\ \sin\left(\frac{\pi}{2} - \pi \int_0^{t-4T_s} g(t')dt'\right), & \text{for } 4T < t \leq 8T \\ 0, & \text{else} \end{cases}$$

$$g(t) = \frac{1}{2T_s}\left(Q\left(2\pi \cdot 0.3t - \frac{5T/2}{T\sqrt{\log_e(2)}}\right) - Q\left(2\pi \cdot 0.3t - \frac{3T/2}{T\sqrt{\log_e(2)}}\right)\right)$$

and $$Q(t) = \frac{1}{\sqrt{2\pi}} \int_t^\infty e^{-\frac{\tau^2}{2}} d\tau.$$

where T is the symbol period.

The base band signal is $$y(t') = \sum_i \hat{s}_i \cdot c_0\left(t' - iT + \frac{5}{2}T\right)$$

The time reference t'=0 is the start of the active part of the burst. This is also the start of the bit period of bit number 0 (the first tail bit) as defined in GSM 05.02. The modulated RF carrier during the useful part of the burst is therefore:

$$x(t') = \sqrt{\frac{2E_s}{T}} \text{Re}\left[y(t') \cdot e^{j(2\pi f_0 t' + \varphi_0)}\right]$$

where $E_S$ is the energy per modulating symbol, $f_0$ is the centre frequency and ($\phi_0$ is a random phase and is constant during one burst.

In a specific embodiment of the present invention, the outputs of the filters 214 and 216 are each 18 bits wide. Accordingly, to simplify downstream circuitry, these outputs are truncated by truncators 218 and 220, to 8 bits. These outputs are again interpolated by interpolators 222 and 224, this time by a factor of eight. In a specific embodiment of the present invention, the times-8 interpolators are implemented by a series of times-2 and times-4 interpolators.

The outputs of the interpolators 222 and 224 drive the DACs 230 and 234. The output of the DACs are filtered by the low-pass filters 232 and 236, generating I on line 250 and Q on line 260. The signals in turn drive the auto-calibrating circuits 228 and 240, which in turn drive the offset circuits 226 and 238. The offset circuits provide one bit of offset correction to the DACs 230 and 234.

In a specific embodiment, the dynamic range at the output of the filters is [−121835, 121835] (18 bits), the range at the output of the truncators is [−119, 119] (8 bits), while the range at the DAC inputs is [−240 240] (9 bits).

FIG. 3 is a chart showing the translation of modulating bits to symbols used in a specific embodiment of the present invention. Each symbol transmitted is one of eight possible symbols. Accordingly, each symbol includes three bits of information, that is, three modulating bits define one symbol. The modulating bits are Gray mapped in groups of three to 8PSK symbols by the equation:

$$S_i = e^{j2\pi l/8}$$

where l is shown in the second column.

Figure 4:
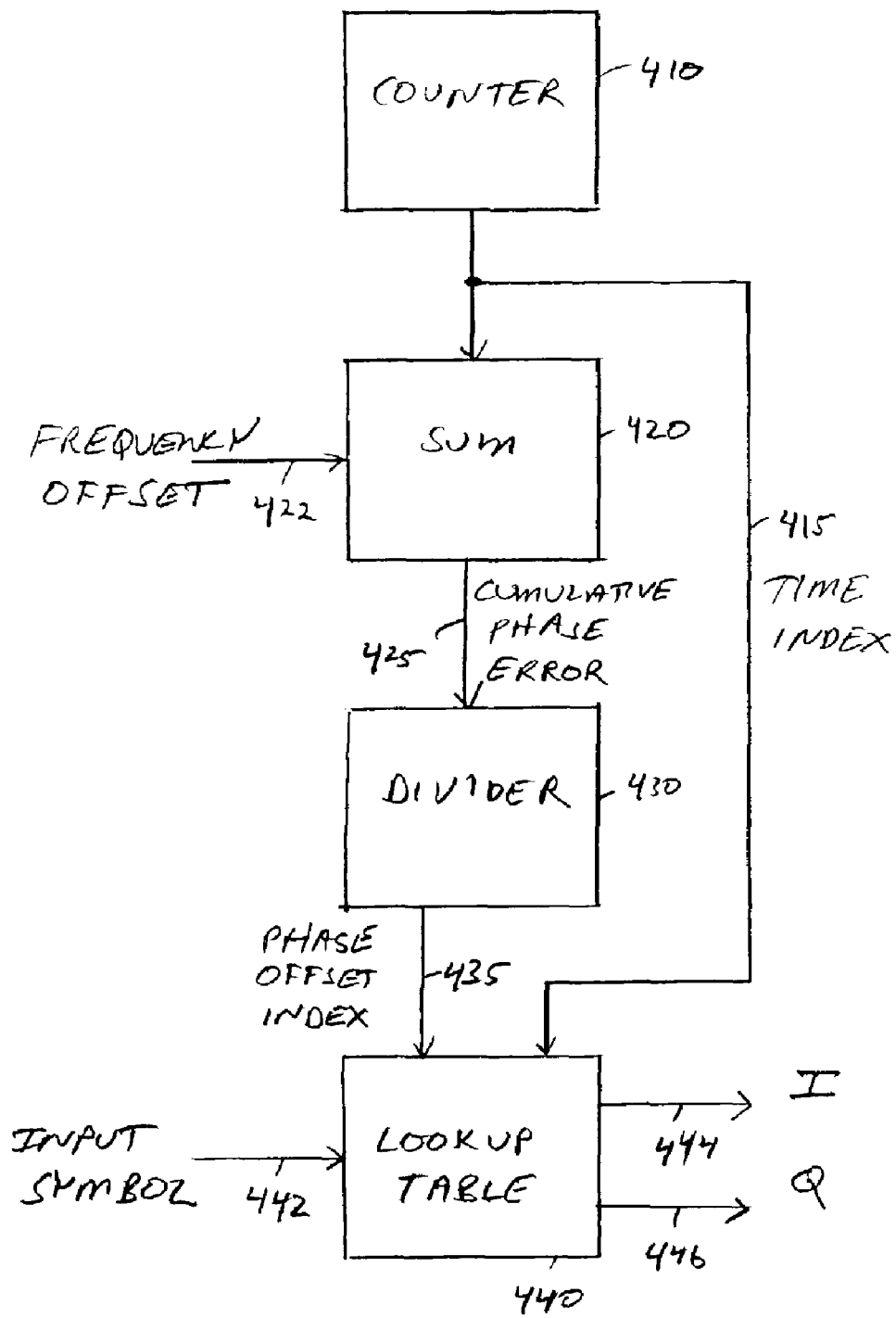
FIG. 4 is a more detailed block diagram of the modulator of FIG. 2.

FIG. 4 is a more detailed block diagram of the modulator of FIG. 2. This modulator may be used to as the modulator 110 in FIG. 1, or as other modulators in other embodiments of the present invention. Included are a counter 410, summer 420, divider 430, and lookup table 440.

The counter 410 counts symbol periods. Typically, this counter counts to a value that is an integral multiple of the divider value of the divider 430. For example, in a specific embodiment to divider divides by 64, while the counter counts 512 symbol periods to 511 before starting again at 0. In other embodiments, other values for these may be used. For example, the divider may divide by 16, 128, or other factor, while the counter may count 256, 1024, or other numbers of periods.

The summer 420 receives the frequency offset on line 422, and the time index or counter value on line 415. The frequency offset received on line 422 is a phase error that corresponds to the rolling phase error between the clock signals generated by the base station and the handset to the incorporates this modulator. The output of the summer 420 is the cumulative phase error on line 425. This signal is divided by divider 430, thus generating a phase offset index on line 435. In a specific embodiment of the present invention, the divider 430 divides the cumulative phase error by 64. In other embodiments, this divider may have a different value. For example, the divider 430 may divide the cumulative phase error on line 425 by a factor of 16, 128, or other factor.

The lookup table 440 receives the phase offset index on line 435, the time index on line 415 and the input symbol on line 442, and provides a value for the I (incident, or in-phase) and Q (quadrature) components of the modulated signal.

I and Q may be found as follows. In the following equations, the input symbol is "i." At any time index t, i has a value between 0 and 7.

First, the offset frequency Δf in Hz is received on line 422 by the summer 420. The accumulated phase error is found by the summer:

Φt≈Φt−1+(Δf>>3);
If Φt >16384, then Φt=Φt−16384;
If Φt<0, then Φt=Φt+16384

Next, the phase offset index is found by dividing the cumulative phase error on line 425 by 64, that is, by shifting it 6 bits to the right:
offset=Φt>>6;

Next, the indexes of in-phase and quadrature components are found:

$$KI = \mod((64i + 96t + 128 + \text{offset}), 512); \quad \text{Equation 1}$$

$$KQ = \mod((64i + 96t + \text{offset}), 512); \quad \text{Equation 2}$$

Let $kI = KI >> 7$ and $kQ = KQ >> 7$, Equation 3

If kI=0,
    Index_I=KI;
Else if kI=1,
    Index_I=255−KI;
Else if kI=2, $$\text{Index}\_I = KI - 256; \quad \text{Equation 4}$$

Else
    Index_I=511−KI.
Ii=Table_8PSK[Index_I];

If kI=2 or kI=3, then Ii=−Ii, Equation 6

Similarly,
If kQ=0,
    Index_Q=KQ;
Else if kQ=1, $$\text{Index}\_Q = 255 - KQ; \quad \text{Equation 5}$$

Else if kQ=2,
    Index_Q=KQ−256;
Else
    Index_Q=511−KQ.
Qi=Table_8PSK[Index_Q];
If kQ=2 or kQ=3, then Qi=−Qi Again, the 8PSK symbols are continuously rotated with 3π/8 radians per symbol before pulse shaping. The rotated symbols are defined as $$\hat{s}_i = s_i \cdot e^{ji3\pi/8}$$

FIG. 5 illustrates the values stored in lookup table 440 in a specific embodiment of the present invention. In this specific example, there are 128 entries in the lookup table. In other embodiments, there may be a different number of entries. For example, there may be 64 or 256 entries.

Figure 6A:
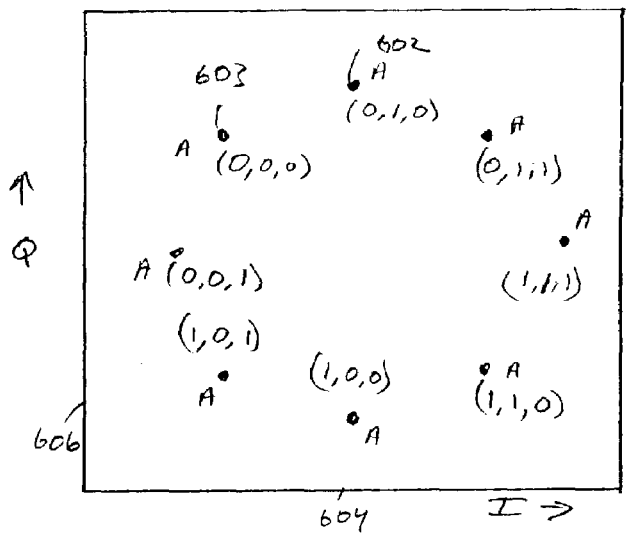
FIG. 6A is a graphical representation of an 8 symbol constellation at a time t used by an embodiment of the present invention.

FIG. 6A is a graphical representation of an 8 symbol constellation at a time t used by an embodiment of the present invention. The 8 symbols 602 are plotted as a function of their in-phase and quadrature component values, specifically, an X-axis 604 and Y-axis 606. The value of the three bits forming each symbol are also shown.

Figure 6B:
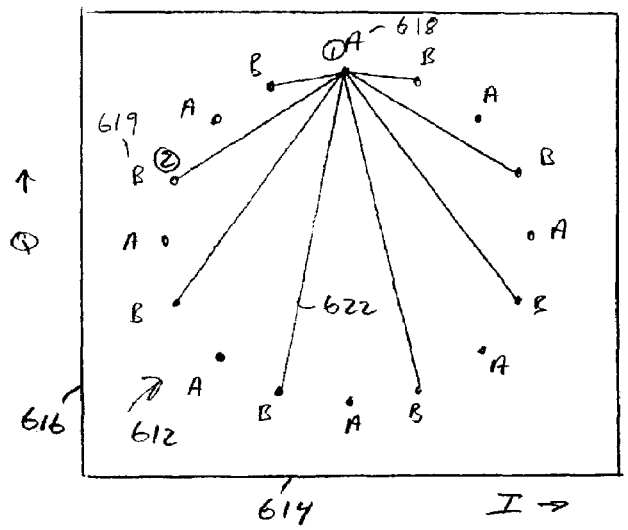
FIG. 6B is a graphical representation of the 8 symbol constellation of FIG. 6A, as well as the 8 symbol constellation for a next symbol to be transmitted following the time t.

FIG. 6B is a graphical representation of the 8 symbol constellation of FIG. 6A, as well as the 8 symbol constellation for a next symbol to be transmitted following the time t. The symbols 612 are plotted as a function of their in-phase and quadrature component values, specifically, an X-axis 614 and Y-axis 616. The possible transmitted symbols, that is the symbol constellation at time t is designated by "A" 618. The symbols that may be transmitted next are designated by "B" 619. Again, each subsequent bit is phase shifted by 3π/8 radians (67.5 degrees). For example, the symbol at position 1 is phase shifted counterclockwise to position 2. Accordingly, the symbol at position 1 may be followed by any of the symbols designated by "B." Thus, the lines 622 indicate each possible symbol transition.

Figure 6C:
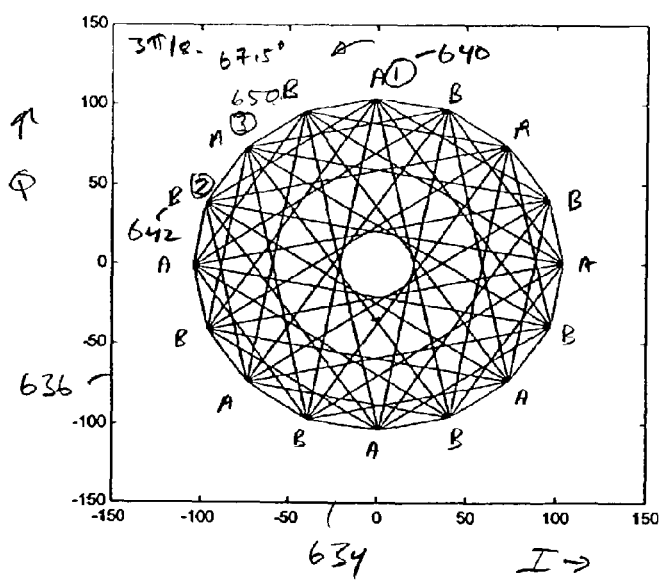
FIG. 6C is a graphical representation illustrating each symbol transition in a constellation of 8 symbols undergoing phase shifts of $3\pi/8$ radians as a function of time.

FIG. 6C is a graphical representation illustrating each symbol transition in a constellation of 8 symbols undergoing phase shifts of 3π/8 radians as a function of time.

That the counter and the look-up table shown in FIG. 5 provide a phase shift of 3π/8 radians to successive symbols can be seen by a simple example. Suppose Equations 1 and 2 are solved for values of i (symbol), t (time), and offset, resulting in KI=256 and KQ=128. Since 256 equals 100000000 in binary, kI=2, from Equation 3. Similarly, since 128 equals 010000000 in binary, kQ=1.

From Equation 4, index_I=KI−256=256−256=0. Similarly, from Equation 5, Index_Q=255−KQ=255−128=127. An inspection of the look-up table of FIG. 5 shows that these I 510 and Q 520 entries are 1 and 104 respectively. Since kI=2, from Equation 6, the polarity of I is reversed, so the symbol has I and Q component values of −1 and 104. As can be seen, these component values correspond to the symbol at position 1 640 in FIG. 6C.

Next let the counter increment t by one, while the symbol transmitted and the offset remain constant for simplicity. As can be seen by Equations 1 and 2 above, the KI and KQ each increase by 96. Accordingly, KI=352 and KQ=224. Since 352 equals 101100000 in binary, kI=2, from equation 3. Since 224 equals 011100000 in binary, kQ=1.

Again, from Equation 4, Index_I=KI−256=352−256=96. Similarly, from Equation 5, Index_Q=255−KQ=255−224=31. An inspection of the look-up table of FIG. 5 shows that these I 530 and Q 540 entries are 97 and 40 respectively. Since kI=2, from Equation 6, the polarity of I is reversed, so the symbol has I and Q component values of −97 and 40. As can be seen, these component values correspond to the symbol at position 2 642 in FIG. 6C. Accordingly, the increment in t by one has changed the current position in the look-up table, such that, along with the above equations, a $3\pi/8$ phase shift has been introduced to consecutive symbols having the same symbol value.

The manner in which a change in symbol value provides a change in I and Q index values can similarly be seen by a simple example. Again, suppose Equations 1 and 2 are solved for values of i (symbol), t (time), and offset, resulting in KI=256 and KQ=128. As before, the symbol has I and Q component values of −1 and 104, which corresponds to the symbol at position 1 640 in FIG. 6C. From FIG. 6A, it can be seen that this symbol may have an value of (0,1,0) at a particular t. From entry 310 in FIG. 3, this symbol has a value of 2. By incrementing i by one in Equations 1 and 2, a symbol having a value of 3 should be output. We can verify this as follows:

Incrementing i by one in Equations 1 and 2 results in KI=256+64=320 and KQ=128+64=192. From Equation 3, kI=2 and kQ=1. As before, from Equation 4, Index_I=KI−256=320−256=64. Similarly, from Equation 5, Index_Q=255−KQ=255−192=63. An inspection of the look-up table of FIG. 5 shows that these I 550 and Q 560 entries are both 74. Since kI=2, from Equation 6, the polarity of I is reversed, so the symbol has I and Q component values of −−74 and 74. As can be seen, these component values correspond to the symbol at position 3 650 in FIG. 6C.

From FIG. 6A, it can be seen that this symbol has corresponds to (0,0,0) at the same time t as above. From entry 320 in FIG. 3, this symbol has a value of 3, which is 2 incremented by one, as expected. In this example, the $3\pi/8$ phase shift and offset components have been ignored for simplicity.

Thus, Equations 1 and 2 can be explained as follows. The counter provides a time index signal t which moves the I and Q index values through the look-up table in such a way as to provide a $3\pi/8$ phase shift. The cumulative phase error is divided to provide a phase index offset, which similarly changes the I and Q index values in such a way as to compensate for the rolling phase error caused by frequency differences between a base station and the handset. Also, changes in symbols move the I and Q index values which provide the appropriate location in the symbol constellation. Accordingly, the look-up table provides an efficient way to account for input symbol value, $3\pi/8$ phase shifting, and frequency correction.

Again, in the above example, and FIGS. 6A-6C are for the special case where there is a zero frequency offset between the handset and the base station.

Figure 7:
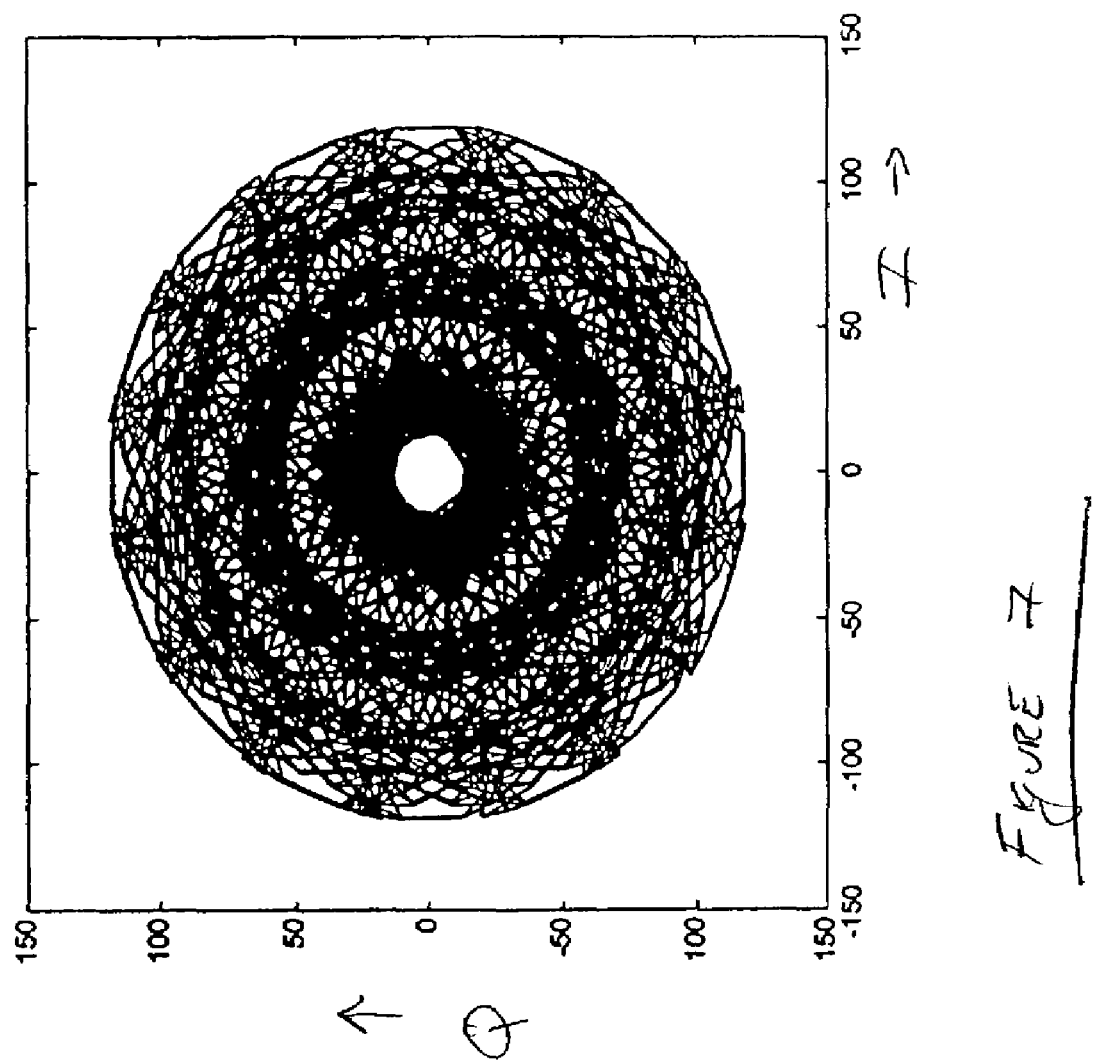
FIG. 7 is the constellation of FIG. 6C after filtering.

FIG. 7 is the constellation of FIG. 6C after filtering. The characteristics of FIG. 7 are determined by the specific filters used.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of transmitting a wireless, signal comprising:
   generating a time index signal;
   receiving a frequency offset signal;
   accumulating the frequency offset signal;
   dividing the accumulated frequency offset signal;
   acquiring at least one symbol to be transmitted wirelessly, said at least one symbol being separate from said time index signal and said frequency offset signal; and
   determining an in-phase component value and a quadrature component value corresponding to the acquired at least one symbol, using each of the time index signal, the divided accumulated frequency offset signal, and the acquired at least one symbol.

2. The method of claim 1, wherein the time index signal is generated using a counter.

3. The method of claim 2, wherein the frequency offset signal is provided by a receiver circuit.

4. The method of claim 2, wherein the dividing the accumulated frequency offset signal is done by right shifting the accumulated frequency offset signal by 6 bits.

5. The method of claim 2, wherein the determining an in-phase component value and a quadrature component value using the time index signal, the divided accumulated frequency offset signal, and the acquired symbol is done using a look-up table.

6. The method of claim 5, wherein the look-up table comprises 128 entries.

7. The method of claim 1, wherein the in-phase component and quadrature components are digitally filtered.

8. The method of claim 7, wherein the digitally filtered in-phase and quadrature components are converted to analog signals, and wherein the analog signals are low-pass filtered.

9. An integrated circuit including a transceiver, the transceiver comprising:
   a receiver; and
   a transmitter coupled to the receiver, the transmitter including a modulator comprising:
   a counter;
   a summer coupled to an output of the counter;
   a divider coupled to an output of the summer; and
   a look-up table coupled to an output of the divider and the output of the counter,
   wherein the lookup table receives input symbols to be wirelessly transmitted, and provides in-phase and quadrature component values corresponding to the received input symbols, said input symbols being separate from said output of the divider and said output of the counter.

10. The integrated circuit of claim 9, wherein the receiver generates a frequency offset signal, and the frequency offset signal is accumulated by the summer.

11. The integrated circuit of claim 10, wherein the counter provides a time index signal.

12. The integrated circuit of claim 9, wherein each input symbol is one of eight symbols.

13. The integrated circuit of claim 12, wherein the time index signal changes a corresponding location in the look-up table such that each symbol is phase shifted by $3\pi/8$ radians.

14. The integrated circuit of claim 9, comprising:
- a digital filter coupled to an output of the loop-up table;
- a digital-to-analog converter coupled to an output of the digital filter; and
- a low-pass filter coupled an output of the digital-to-analog converter.

15. A modulator of a transmitter, the modulator comprising:
- a counter configured to provide a time index signal;
- a summer configured to receive a frequency offset signal and the time index signal and provide a cumulative phase error;
- a divider configured to receive the cumulative phase error and provide a phase offset index; and
- a look-up table configured to receive the phase offset index and the time index, and further configured to receive an input symbol, and provide in-phase and quadrature component values corresponding to the received input symbol, said input symbol being separate from said phase offset index and said time index.

16. The modulator of claim 15, wherein the counter counts to a first number, the divider divides by a second number, and the first number is an integral multiple of the second number.

17. The modulator of claim 16, wherein the counter counts to 512 and the divider divides by 64.

18. The modulator of claim 16, wherein the input symbol comprises three bits of information.

19. The modulator of claim 15, wherein the in-phase and quadrature component values are provided to a digital filter.

20. The modulator of claim 15, wherein the look-up table comprises 128 entries.

* * * * *